US012560623B2

(12) United States Patent
Nogami et al.

(10) Patent No.: US 12,560,623 B2
(45) Date of Patent: Feb. 24, 2026

(54) CONTROL METHOD FOR AUTOMATIC ANALYZER

(71) Applicant: HITACHI HIGH-TECH CORPORATION, Tokyo (JP)

(72) Inventors: Makoto Nogami, Tokyo (JP); Yushi Harada, Tokyo (JP); Yuichiro Hashimoto, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 646 days.

(21) Appl. No.: 17/922,398

(22) PCT Filed: May 19, 2021

(86) PCT No.: PCT/JP2021/018977
§ 371 (c)(1),
(2) Date: Oct. 31, 2022

(87) PCT Pub. No.: WO2021/241357
PCT Pub. Date: Dec. 2, 2021

(65) Prior Publication Data
US 2023/0184802 A1 Jun. 15, 2023

(30) Foreign Application Priority Data

May 29, 2020 (JP) ................................. 2020-094277

(51) Int. Cl.
*G01N 35/10* (2006.01)
(52) U.S. Cl.
CPC ..... *G01N 35/1011* (2013.01); *G01N 35/1097* (2013.01)
(58) Field of Classification Search
None
See application file for complete search history.

(56) References Cited

U.S. PATENT DOCUMENTS 6,265,226 B1 * 7/2001 Petro .................... B01J 19/0046
422/63
6,296,771 B1 * 10/2001 Miroslav ............ G01N 35/1097
73/61.52
(Continued)

FOREIGN PATENT DOCUMENTS

EP 0360604 A2 3/1990
JP 2-132369 A 5/1990
(Continued)

OTHER PUBLICATIONS

International Search Report of PCT/JP2021/018977 dated Jul. 13, 2021.

*Primary Examiner* — Brian R Gordon
(74) *Attorney, Agent, or Firm* — MATTINGLY & MALUR, PC

(57) ABSTRACT

A control method for an automatic analyzer that can improve robustness, throughput, and measurement accuracy. The automatic analyzer includes a sample loop connected between two sample ports of a plurality of sample ports of a switch valve. The method includes the steps of: adjusting a drive parameter of the syringe corresponding to a viscosity of the sample acquired in advance; switching the switch valve to a first state in which the sipper and the syringe contact with each other without through the sample loop; driving the syringe based on the drive parameter to draw and introduce the sample through the sipper; switching the switch valve to a second state in which the syringe and the sample loop conduct with each other; and driving the syringe based on the drive parameter to introduce the sample into the sample loop.

7 Claims, 22 Drawing Sheets

(56)                    References Cited

U.S. PATENT DOCUMENTS

| | | | | |
|---|---|---|---|---|
| 6,436,292 | B1 * | 8/2002 | Petro ..................... | G01N 35/085 |
| | | | | 210/659 |
| 7,588,725 | B2 * | 9/2009 | Ozbal ............... | G01N 35/00009 |
| | | | | 73/863.01 |
| 8,414,774 | B2 * | 4/2013 | LaMarr .................. | G01N 30/84 |
| | | | | 436/177 |
| 2006/0054543 | A1 * | 3/2006 | Petro ..................... | G01N 30/34 |
| | | | | 210/101 |
| 2006/0211132 | A1 * | 9/2006 | Miledi .................. | B01L 3/0265 |
| | | | | 436/180 |
| 2008/0236301 | A1 * | 10/2008 | Fukushima ........ | G01N 35/1016 |
| | | | | 222/23 |
| 2011/0020939 | A1 | 1/2011 | Cormier | |
| 2015/0219680 | A1 | 8/2015 | Mimura et al. | |
| 2015/0308986 | A1 | 10/2015 | Ito et al. | |
| 2017/0285057 | A1 * | 10/2017 | Andersen ............... | G01N 21/05 |
| 2020/0278370 | A1 * | 9/2020 | Scheuermann ....... | B01L 3/0237 |
| 2021/0154659 | A1 * | 5/2021 | Romer .............. | G01N 35/1011 |

FOREIGN PATENT DOCUMENTS

| | | | |
|---|---|---|---|
| JP | 2-176538 | A | 7/1990 |
| JP | 2003-83851 | A | 3/2003 |
| JP | 2011-513732 | A | 4/2011 |
| JP | 2013-178171 | A | 9/2013 |
| JP | 2014-44174 | A | 3/2014 |
| JP | 2014-119400 | A | 6/2014 |

* cited by examiner

CONTROL METHOD FOR AUTOMATIC ANALYZER

TECHNICAL FIELD

The present invention relates to a control method for an automatic analyzer.

BACKGROUND ART

A liquid chromatograph mass spectrometer (HPLC/MS) is a device combining a liquid chromatograph (HPLC) with a mass spectrometer (MS). In the liquid chromatograph mass spectrometer (HPLC/MS), separation based on the chemical structure and physical properties of a measurement target substance by a liquid chromatograph (HPLC) is combined with separation based on the mass of the measurement target substance by the mass spectrometer (MS), and thus the qualification and quantification of components in a sample can be performed. With such features of the liquid chromatograph mass spectrometer (HPLC/MS), for example, also in the case in which a large number of similar substances that are metabolized in the body and mixed like medical and pharmaceutical products in a biological sample, the qualification and quantification of a measurement target substance is possible, and the application of the liquid chromatograph mass spectrometer is expected to the field of clinical examinations. In testing centers, university hospitals, and the like, tests such as immunosuppressive agents, anticancer agents, newborn metabolic disorder tests, and Therapeutic Drug Monitoring (TDM), and the like are performed using the liquid chromatograph mass spectrometer (HPLC/MS). Pretreatment is performed using test kits and a method for, and the treated samples are submitted to the liquid chromatograph mass spectrometer (HPLC/MS). The inspection (validation) of test methods is conducted under responsibility of inspection agencies for assuring test results. Since pretreatment processes are complicated, test results vary due to the degree of skills of testing technicians. Moreover, in measurement in pretreatment or in the liquid chromatograph mass spectrometer (HPLC/MS), problems might occur in test results due to human errors. Therefore, the development of an automatic analyzer that is capable of fully automatically conducting a batch process from pretreatment to a liquid chromatograph mass spectrometer (HPLC/MS) is requested to the field of clinical examinations.

Examples of a mode for an autosampler that is adopted to introduction of a sample to the liquid chromatograph (HPLC) include a Partial-Loop-Injection mode and a Direct-Injection mode. The Partial-Loop-Injection mode introduces a sample loop sample connected between two ports by the drive amount of a syringe connected to a six-port two-position high pressure valve (6-Port 2-Position Valve), for example. Since the Partial-Loop-Injection mode has a relatively simple structure, the Partial-Loop-Injection mode has features excellent in handling. On the other hand, the Direct-Injection mode has a structure in which a sipper and a sample loop are integrated with each other, for example, and a mobile phase discharged from a liquid delivery pump passes the sample loop and the sipper. In the Direct-Injection mode, since all the sample aspirated by the syringe can be used, no sample is wasted. However, in the Direct-Injection mode, since it is not possible to use all the sample aspirated by the syringe, the sample is wasted. Moreover, since the Direct-Injection mode has to have a structure that maintains high pressure in order that a joining part of the sipper to the six-port two-position high pressure valve avoids a leakage of a sample, the structure is relatively complicated. From such situations, as a mode for the autosampler suited for the automatic analyzer that is capable of fully automatically conducting a batch process, the Partial-Loop-Injection mode is mainly adopted.

For example, Patent Literature 1 discloses an analyzer including an output port including a sample loop, the output port communicating an LC column with a fluid, an injection valve having an input port communicating a mobile phase supply line with a fluid, a sample pump, at least two standard supply sources associated with at least two medical and pharmaceutical products, and a selection valve that selectively connects the sample pump to the at least two standard supply sources, a sample injection valve, and at least two medical and pharmaceutical product manufacture process lines associated with at least two medical and pharmaceutical products.

Moreover, Patent Literature 2 discloses a liquid chromatograph sample injection method in which the piston of a measuring syringe is pulled to aspirate a sample into a suction pipe connected to the measuring syringe through air, a valve is then switched to separate a sample loop interposed and connected between the liquid delivery pump of a liquid chromatograph and a column from the connection, the sample loop is interposed and connected to the middle part of the suction pipe, the piston of the measuring syringe is pressed to introduce a sample solution in the suction pipe on the measuring syringe side into the inside of the sample loop, the valve is switched to the original state, and the sample loop is connected between the liquid delivery pump and the column to inject the sample solution in the sample loop into the column.

Moreover, Patent Literature 3 discloses a method for transferring a liquid sample using a valve having at least two kinds of positions, the method including the steps of passing a sample by a valve at a first position through the valve in a first direction, switching the valve to a second position, and passing at least a part of the sample through the valve at the second position.

CITATION LIST

Patent Literature

Patent Literature 1: Japanese Unexamined Patent Application Publication No. 2011-513732
Patent Literature 2: Japanese Unexamined Patent Application Publication No. Hei(1990)-02-132369
Patent Literature 3: Japanese Unexamined Patent Application Publication No. Hei(1990)-02-176538

SUMMARY OF INVENTION

Technical Problem

For an autosampler suited for an automatic analyzer that is capable of fully automatically conducting a batch process, "structural simplicity" and "being maintenance free" in regard to robustness are requested, "shortening a washing process" and "shortening a sample introduction process" in regard to throughput are requested, and "the optimization of the washing process" and "the optimization of the sample introduction process" in regard to measurement precision are requested.

However, since the previously existing technique described in Patent Literature 1 discloses the configuration having only one pump (corresponding to the syringe that delivers a sample), the configuration is not allowed to perform the washing process and the sample introduction process in parallel with each other, and thus it is difficult to achieve "shortening the washing process" and "shortening the sample introduction process" in throughput.

Moreover, since the previously existing technique described in Patent Literature 2 has the configuration in which the sample is temporarily compressed and then returned to the original state, bubbles produced from the remaining air in an air layer and the sample in this process are mixed in the sample. The introduction of the bubbles into the sample loop degrades analysis precision, and thus it is difficult to achieve "the optimization of the washing process" and "the optimization of the sample introduction process" in measurement precision.

Moreover, the previously existing technique described in Patent Literature 3 has the configuration in consideration of backlash of the driving mechanism of the syringe. Therefore, when the achievement of "shortening the washing process" and "shortening the sample introduction process" in throughput is taken into account, the necessity of shortening each process occurs, resulting in the difficulty of removing bubbles produced by the backlash. Since mixing bubbles degrades analysis precision, it is difficult to achieve "the optimization of the washing process" and "the optimization of the sample introduction process" in measurement precision.

The present invention has been made in view of the circumstances, and an object is to provide a control method for an automatic analyzer that is capable of improving robustness, throughput, and measurement precision.

Solution to Problem

The present application includes multiple schemes to solve the problems, and an example is a control method for an automatic analyzer including a switch valve having a plurality of sample ports, the switch valve configured to selectively switch between conduction and interruption between the plurality of sample ports, a sample loop connected between two sample ports, a first sample port and a second sample port in the plurality of sample ports of the switch valve, a syringe connected to a third sample port different from the first sample port and the second sample port of the switch valve, a sipper connected to a fourth sample port different from the first sample port to the third sample port of the switch valve, the sipper immersed in a sample housed in a sample vessel, the method including the steps of: adjusting a drive parameter of the syringe corresponding to a viscosity of the sample acquired in advance; switching the switch valve to a first state in which the sipper and the syringe contact with each other without through the sample loop; driving the syringe based on the drive parameter to draw and introduce the sample through the sipper; switching the switch valve to a second state in which the syringe and the sample loop conduct with each other; and driving the syringe based on the drive parameter to introduce the sample into the sample loop.

Advantageous Effects of Invention

According to the present invention, it is possible to achieve "structural simplicity" and "being maintenance free" in regard to robustness, "shortening the washing process" and "shortening the sample introduction process" in regard to throughput, and "the optimization of the washing process" and "the optimization of the sample introduction process" in regard to measurement precision.

DESCRIPTION OF EMBODIMENTS

In the following, an embodiment of the present invention will be described with reference to the drawings.

Figure 1:
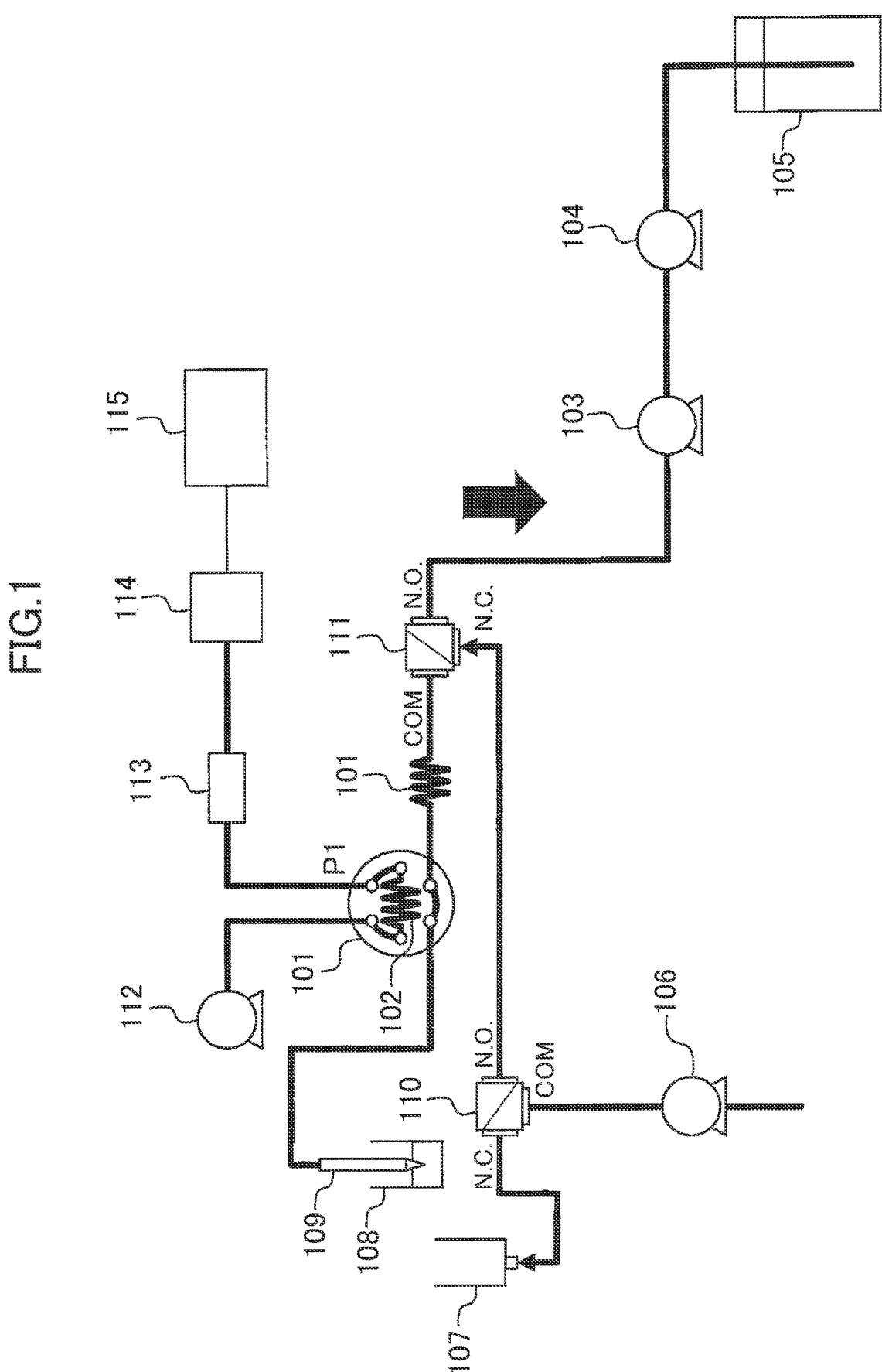
FIG. 1 is a diagram schematically showing the overall structure of an automatic analyzer, which is a diagram showing functional units as an autosampler that is extracted with relating components.

FIG. 1 is a diagram schematically showing the overall structure of an automatic analyzer according to the present embodiment, and is a diagram showing functional units as an autosampler extracted together with relating components.

Note that in the present embodiment, it is assumed that a sample subjected to pretreatment such as purification/condensation by a pretreatment unit, not shown, of the automatic analyzer is housed in a sample vessel 108 (described later) and transferred to an aspiration position by a sipper 109 (described later). For purification/condensation by the pretreatment unit in the present embodiment, a method using magnetic beads is adopted, for example. A functional group bonded to the surface of the magnetic bead may be any of a reversed phase mode, normal phase mode, molecular weight fraction mode, HILIC mode, and antigen antibody reaction mode. Moreover, for purification/condensation in the pretreatment unit, solid-phase extraction, liquid/liquid extraction, protein removal treatment, and the like may be used other than magnetic beads.

In FIG. 1, the automatic analyzer has an injection valve 101, a sample loop 102, a syringe 103, a gear pump 104, a system water container 105, a washing pump 106, a washing chamber 107, a sample vessel 108, a sipper 109, a solenoid valve 1 (Step S11) 1, a liquid delivery pump 112, a separation column 113, a detector 114, and a controller 115.

The injection valve 101 is a switch valve that has a plurality of sample ports and that selectively switches between conduction and interruption among the plurality of sample ports. In the present embodiment, a case of using a six-port two-position high pressure valve having a withstand pressure function at a high pressure of 100 MPa is exemplified for description.

Figure 6:
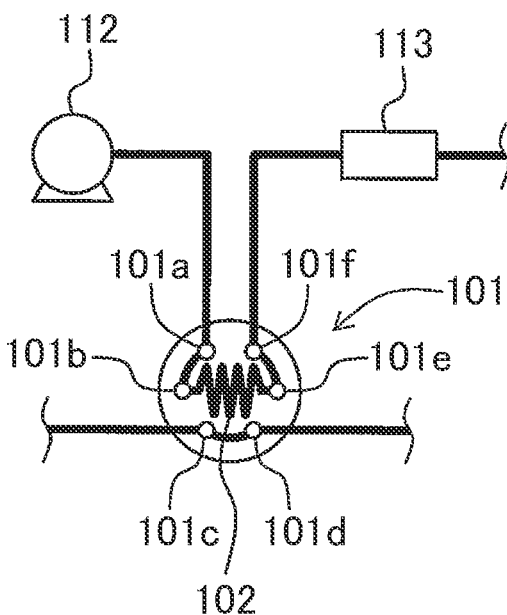
FIG. 6 is a diagram schematically showing the configuration of an injection valve, which is a diagram showing the case in which the position of the injection valve is switched to position A.
Figure 7:
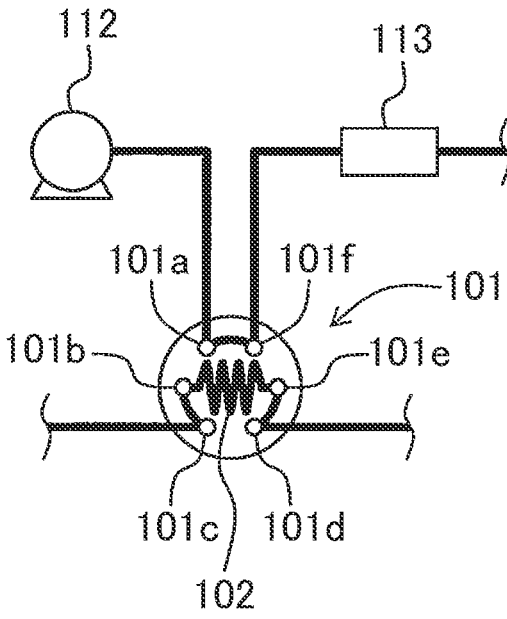
FIG. 7 is a diagram schematically showing the configuration of the injection valve, which is a diagram showing the case in which the position of the injection valve is switched to position B.

FIGS. 6 and 7 are diagrams schematically showing the configuration of the injection valve. FIG. 6 is a diagram showing a case in which the injection valve is switched to one position, and FIG. 7 is a diagram showing a case in which the injection valve is switched to the other position.

In FIGS. 6 and 7, the injection valve 101 has a plurality of (in the present embodiment 6, six) sample ports 101a to 101f. To the sample port 101a, the liquid delivery pump is connected, to the sample port 101b, one end of the sample loop 102 (described later) is connected, to the sample port 101c, the sipper 109 is connected, to the sample port 101d, the syringe 103 is connected through the solenoid valve 111, to the sample port 101e, the other end of the sample loop 102 (described later) is connected, and to the sample port 101f, the separation column 113 is connected.

In the injection valve 101, the head of the valve is rotated to at two positions to switch the passage of a slit groove provided in a stator in the inside, and the injection valve 101 is connected to any one of the sample ports adjacent in the circumferential direction, and interrupted from the other, and thus the conduction and interruption of the sample ports are selectively switched. Specifically, at a position shown in FIG. 6 (in the following, referred to as a position A), the sample port 101a is conducted to the sample port 101b, the sample port 101c to the sample port 101d, and the sample port 101e to the sample port 101f, and the liquid delivery pump 112, the sample loop 102, and the separation column 113 are connected to each other, and the sipper 109 is connected to the syringe 103 (the solenoid valve 111). Moreover, at a position shown in FIG. 7 (in the following, referred to as a position B), the sample port 101a is conducted to the sample port 101f, the sample port 101b to the sample port 101c, the sample port 101d to the sample port 101e, the liquid delivery pump 112 is connected to the separation column 113, and the sipper 109, the sample loop 102, and the syringe 103 (the solenoid valve 111) are connected to each other.

In the state in which the injection valve 101 is switched to the position A, since the passage from the liquid delivery pump 112 is connected, liquid delivery is performed under the conditions at a maximum high pressure of 100 Mya, for example. Moreover, in the state in which the injection valve 101 is switched to the position B, since the injection valve 101 is connected to the syringe 103 or the gear pump 104 in the subsequent stage of the syringe 103, liquid delivery is performed under the conditions at a low pressure at 1 MPa or less (e.g. 300 KPa) even at the maximum. Consequently, in the case in which the injection valve 101 is switched from the position A to the position B, the pressure of the passage in the inside of the injection valve 101 (including the sample loop 102) fluctuates from a high pressure to a low pressure. On the other hand, in the case in which the injection valve 101 is switched from the position B to the position A, the pressure of the passage in the inside of the injection valve 101 (including the sample loop 102) fluctuates from a low pressure to a high pressure. That is, the position of the sample in the passage in the inside of the injection valve 101 including the sample loop 102 and the position of a washing fluid move every time when the position of the injection valve 101 is switched to cause fluctuations in pressure. These fluctuations affect measurement precision.

The sample loop 102 is a pipe that is precisely managed. In the present embodiment, for example, the sample loop 102 uses a pipe whose material is stainless steel (SUS: Steel Use Stainless) having an inner diameter of 0.3 mm, an outer diameter of $\frac{1}{16}$ inches, a length of 283 mm, and a volume of 20 μL for the sample loop 102. Note that the material may be other than SUS, and may be another material such as PEEK (Polyetheretherketone), or fused silica coated with PEEK, PTFE (Polytetrafluoroethylene), or PFA (Perfluoroalkoxyalkane), for example. Moreover, the dimensions of the pipe may be appropriately changed matching the measurement conditions. For inner diameter precision, a tolerance ±30% at the maximum is provided, and in a sample loop of 20 µL, a tolerance of 27.32 µL at the maximum occurs. For example, in the present embodiment, since liquid delivery at 444 µL/min is considered, an error at 3.7 seconds at the maximum occurs. The tolerance of the inner diameter of this sample loop 102 affects measurement precision.

The syringe 103 has a stepping motor, not shown, and is driven by controlling the pulse of this stepping motor. In the present embodiment, for example, the syringe 103 has an inner diameter of 23.8 mm, a length of 85 mm, and a plunger capacity of 723 µL. Note that the syringe 103 may be driven by other than the stepping motor, and the syringe 103 may be formed to be driven by a servo motor, for example. In the case in which the syringe 103 is driven by the servo motor, feedback control is performed to a motor driver using an encoder (rotation detector).

The gear pump 104 is disposed in the subsequent stage of the syringe 103, having a function that supplies system water (here, pure water) housed in the system water container 105 to the syringe 103 and the passage in the previous stage of the syringe 103. Between the syringe 103 and the system water container 105, a two-way solenoid valve, not shown, is disposed, and OPEN/CLOSE control of the two-way solenoid valve controls the supply of the system water from the system water container 105 to the inside of the syringe 103 by the gear pump 104. The pressure of the system water to be supplied by the gear pump 104 is 300 KPa, for example. Note that the set value of the discharge pressure (pressure value) of the system water by the gear pump 104 is changed using the withstand pressure of the two-way solenoid valve or the solenoid valve 111 disposed in the previous stage of the gear pump 104.

The washing pump 106 is a diaphragm pump, for example. The passage of the washing pump 106 is connected to the solenoid valve 110. On the up stream of the washing pump 106, a low-pressure three-way solenoid valve, not shown, is provided, and to the three-way solenoid valve, three kinds of washing solvents (solvent SA: ultrapure water, solvent SB: acetonitrile, and solvent SC: methanol) are respectively connected. The washing solvents can be changed by switching the solenoid valve based on the washing conditions set by a user for every measurement target component. The washing pump 106 performs washing and the like of the inside of the pipe passage and the inner side of the sipper 109 by discharging the washing solvent. Moreover, the washing pump 106 supplies the washing solvent to the washing chamber 107 through the solenoid valve 110.

The washing chamber 107 washes the outer side of the sipper 109 by storing the washing solvent at the washing port to immerse the sipper 109.

Figure 8:
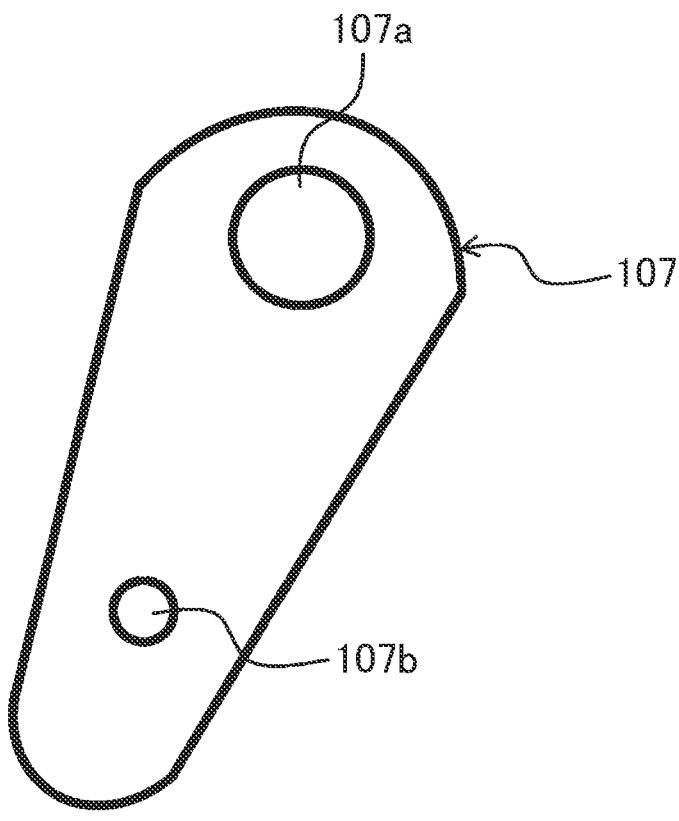
FIG. 8 is a diagram schematically showing the configuration of a washing chamber, which is a diagram showing an example configuration of the washing chamber.
Figure 9:
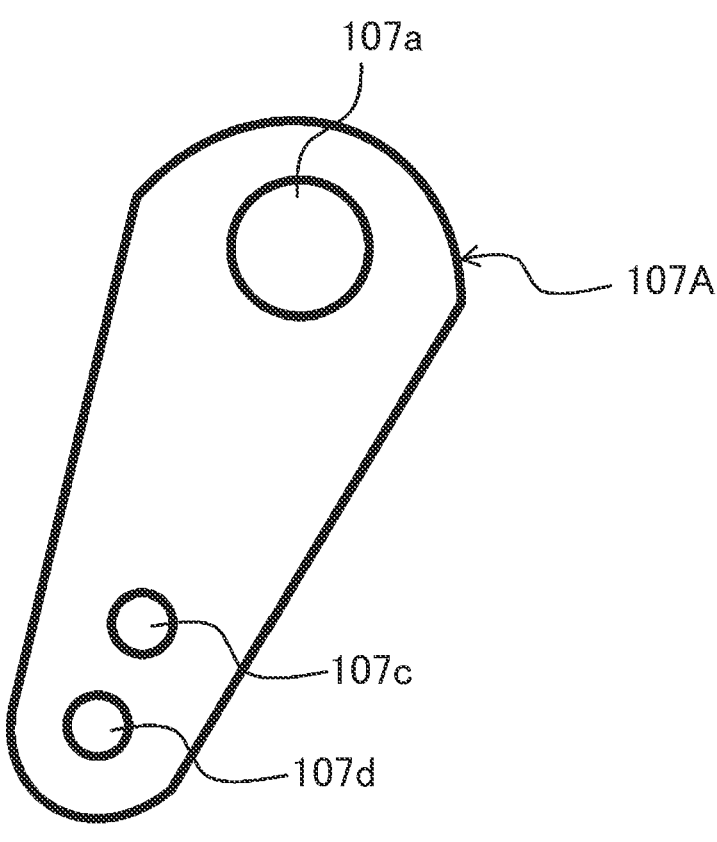
FIG. 9 is a diagram schematically showing the configuration of a washing chamber, which is a diagram showing another example configuration of a washing chamber.

FIGS. 8 and 9 are diagrams schematically showing the configuration of the washing chamber. FIG. 8 is a diagram showing an example configuration of the washing chamber, and FIG. 9 is a diagram showing another example configuration of the washing chamber.

As shown in FIG. 8, the washing chamber 107 includes a washing solvent discharge port 107*a* and one washing port 107*b*. Moreover, in FIG. 8, a washing chamber 107A has a washing solvent discharge port 107*a* and two washing ports 107*c* and 107*d* for an organic solvent and water.

In the case in which the washing port 107*b* is provided at one place like the washing chamber 107 shown in FIG. 8, the normal close side of the solenoid valve 110 is connected to the washing port 107*b*. The washing port 107*b* is supplied with three kinds of washing solvents (SA, SB, and SC) connected to the upstream of the washing pump 106 through a low-pressure three-way solenoid valve, not shown, while switching the washing solvents. On the other hand, in the case in which the washing ports 107*c* and 107*d* are provided at two places like the washing chamber 107A shown in FIG. 9, the normal close side of the solenoid valve 110 is connected to the washing port 107*c* for an organic solvent. The washing port 107*c* is supplied with three kinds of washing solvents (SA, SB, and SC) connected to the upstream of the washing pump 106 through the low-pressure three-way solenoid valve, not shown, while switching the washing solvents.

The sample vessel 108 is a cup that is precisely managed. In the present embodiment, for example, as the sample vessel 108, a sample cup is used whose material is PTFE, having a lower inner diameter of 5 mm, an upper inner diameter of 6 mm, a height of 26 mm, and a volume of 250 µL. The sample vessel 108 is retained at a sample cup retaining position, not shown. The sample vessel 108 houses a sample containing a measurement target component purified/condensed with magnetic beads by the pretreatment unit, for example. There is a possibility that micro magnetic beads remain in the sample purified/condensed with magnetic beads, and when these magnetic beads are aspirated/discharged by the sipper 109, this might lead to clogging or contamination of the passage pipe, the injection valve 101, the separation column 113, or the detector 114. Therefore, in the present embodiment, the capacity of the sample containing the measurement target component purified/condensed by the pretreatment unit is calculated from the measurement conditions for the pretreatment unit in order that only a supernate or a supernatant can be aspirated by the sipper 109, and the amount of descent of the sipper is changed corresponding to the calculated capacity. Moreover, by providing a magnet on throughout the inner surface at the sample cup retaining position, micro magnetic beads are magnetically collected on the wall surface of the sample vessel 108, and thus the micro magnetic beads are prevented from being mixed in the aspiration/discharge of the sipper 109.

In the present embodiment, for example, as the sipper 109, a pipe is used whose material is stainless steel (SUS: Steel Use Stainless) having an inner diameter of 0.3 mm, an outer diameter of 1/16 inches, a length of 20 mm, and a volume of 1.41 µL. The inner side of the sipper 109 is treated with surface polishing in order to reduce carry-over. At the connecting part of the sipper 109 to the pipe, fitting that matches zero dead volumes is used in order to prevent dead volumes. Thus, a reduction in the diffusion and carry-over of the sample is intended.

The solenoid valve 1 (Step S11) 1 is a diaphragm type three-way solenoid valve, for example.

Figure 10:
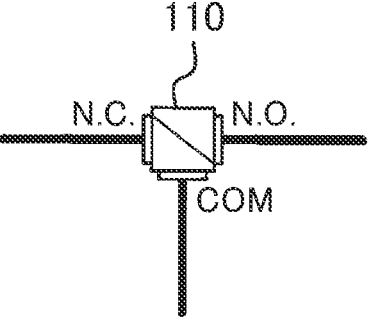
FIG. 10 is a diagram schematically showing the configuration of a solenoid valve, which is a diagram showing a solenoid valve connected to a washing pump.
Figure 11:
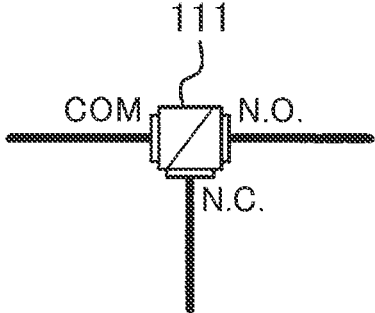
FIG. 11 is a diagram schematically showing the configuration of a solenoid valve, which is a diagram showing a solenoid valve connected to a syringe.

FIGS. 10 and 11 are diagrams schematically showing the configuration of the solenoid valve. FIG. 10 is a diagram showing the solenoid valve connected to the washing pump, and FIG. 11 is a diagram showing the solenoid valve connected to the syringe.

As shown in FIG. 10, the solenoid valve 110 has a common port (COM), a normal open port (N.O.) that is normally opened, and a normal close port (N.C.) that is normally closed. To the common port (COM) of the solenoid valve 110, the passage of the washing pump 106 is connected, to the normal open port (N.O), the solenoid valve 111 is connected, and to the normal close port (N.C.), the washing chamber 107 is connected. The solenoid valve 110 is controlled so as to connect the passages of the normal open port and the common port to each other when the inner sides of the pipe, the sample loop 102, the injection valve 101, the sipper 109, and the like are washed. Moreover, in supply of the washing solvent from the washing pump 106 to the washing chamber 107, control is performed so as to connect the passages of the normal close port and the common port to each other.

As shown in FIG. 11, the solenoid valve 111 has a common port (COM), a normal open port (N.O.) that is normally opened, and a normal close port (N.C.) that is normally closed. To the common port (COM) of the solenoid valve 110 of the solenoid valve 111, the injection valve 101 is connected, to the normal open port (N.O), the syringe 103 is connected, and to the normal close port (N.C.), the solenoid valve 110 is connected. The solenoid valve 111 is controlled so as to connect the passages of the normal close port and the common port to each other in aspiration/discharge using the syringe 103 and liquid delivery from the gear pump 104. Moreover, in supply of the washing solvent from the washing pump 106, control is performed so as to connect the passages of the normal close port and the common port to each other. Note that when the inner sides of the pipe, the sample loop 102, the injection valve 101, the sipper 109, and the like are washed, the valve on the normal open side is opened in the solenoid valve 110.

The liquid delivery pump 112 has a configuration having two plungers, and is a pump that is capable of continuously performing delivery of a solvent at a high pressure (e.g. 100 MPa) by reciprocating drive of the two plungers by pulse control. In the present embodiment, for example, the liquid delivery pump 112 is formed of two pumps, a pump A and a pump B, not shown, and liquid delivery is performed under the gradient conditions set by the user for every measurement target component, while changing the ratio between the pump A and the pump B. The delivery solvents delivered from the pump A and the pump B are mixed with a mixer, not shown, provided in the subsequent stage. The solvent ratio between the pumps A and B of the liquid delivery pump 112 can be changed with a low-pressure solenoid valve, not shown, corresponding to the mixing conditions set for every measurement target component by the user. In the present embodiment, a case is exemplified in which six kinds of delivery solvents (solvent SA: ultrapure water, solvent SB: acetonitrile, solvent SC: methanol, and solvent VB1: formic acid (1 mol/L), solvent VB2: aqueous ammonia (1 mol/L), and solvent VB3: acetic acid ammonium (1 mol/L)) are used. The six kinds of solvents are mixed at the low-pressure solenoid valve, and delivered to the pumps A and B, and gradient liquid delivery is performed corresponding to a change in the ratio between the pumps A and B.

The separation column 113 is filled with a filler having an inner diameter of 1.0 mm, a length of 50 mm, and a particle diameter of 2.6 mm, for example. In the present embodiment, a case is exemplified in which a reversed phase mode is used for the separation mode of the separation column 113. Note that the separation mode of the separation column 113 is not limited to the reversed phase mode, and for example, a normal phase mode, molecular weight fraction mode, HILIC mode, antigen antibody reaction mode, and any other mode may be used.

The detector 114 is a mass spectrometer, and a triple quadrupole mass spectrometer, for example, is used. The triple quadrupole mass spectrometer has features excellent in quantitative determination. Note that the mass spectrometer does not necessarily have to be a triple quadrupole mass spectrometer (Triple Q-MS), which may be an ion trap mass spectrometer (Iontrap-MS) or a time-of-flight mass spectrometer (TOF-MS). Moreover, the detector 114 is not a mass spectrometer, which may be a diode array detector, UV detector, or tendency detector.

The controller 115 controls the operation of the entire automatic analyzer including the functional units as the autosampler, for example, which is a PC (Personal Computer), automatic analyzer driver, and the like. The controller 115 has functional units such as a storage unit that stores programs, various settings, information necessary for other analyses (e.g. physical property information of a sample (viscosity and the like)), and the like, a control unit that performs the arithmetic operation of control signals and the like using the programs and the like stored in the storage unit, and a signal output unit that outputs the control signals to the components of the automatic analyzer for drive, and the controller 115 controls the operation of the automatic analyzer based on instructions and information from an input device, not shown.

Figure 12:
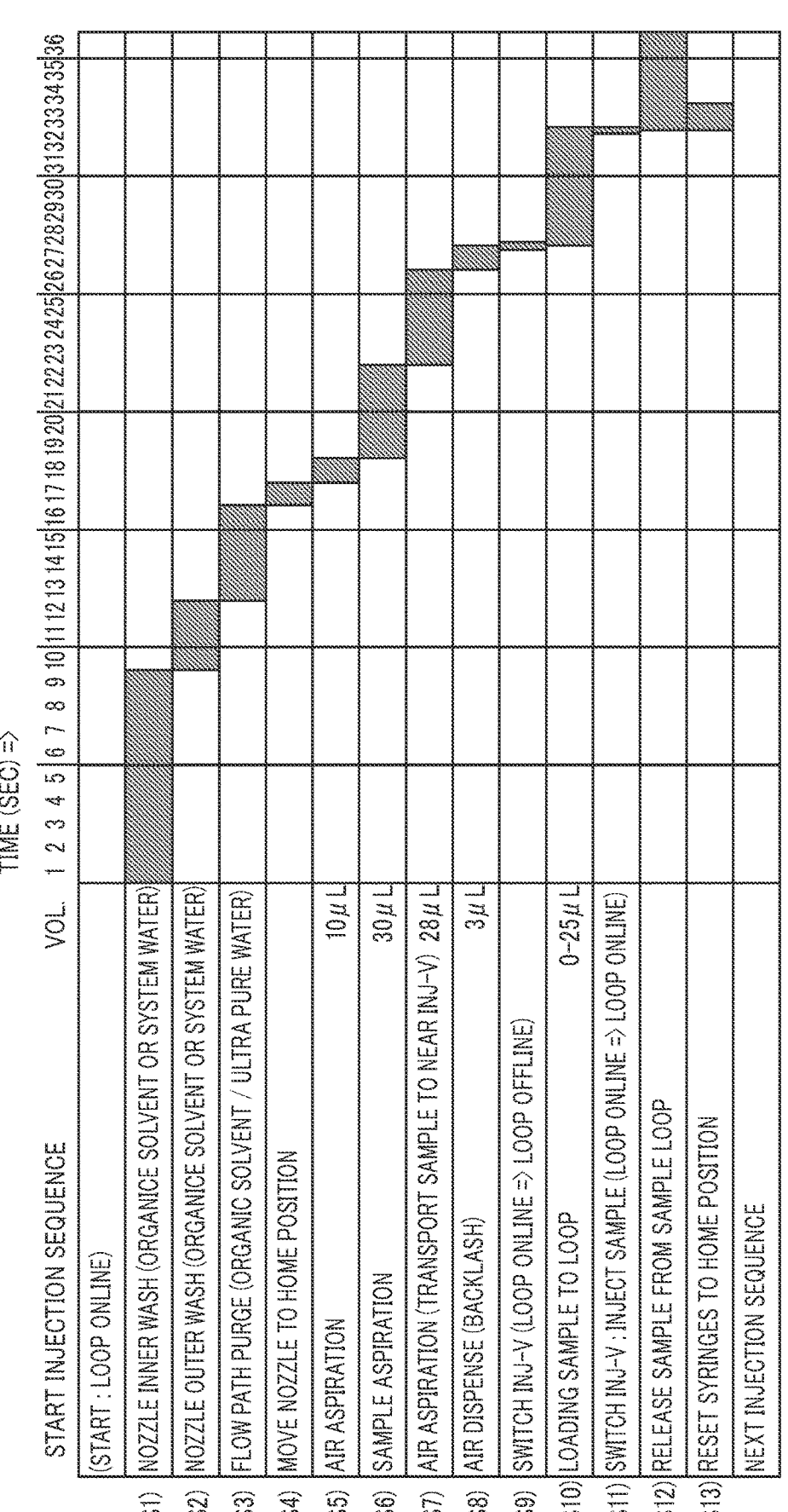
FIG. 12 is a time chart showing example operations of the functional units of the autosampler as the automatic analyzer.

FIG. 12 is a time chart showing example operations of the functional units as the autosampler of the automatic analyzer in the present embodiment.

As shown in FIG. 12, the operation of the functional units as the autosampler of the automatic analyzer includes 13 processes, for example, a sipper inner washing process (Step S1), a sipper outer washing process (Step S2), a passage purge process (Step S3), a move-sipper-to-home position process (Step S4), an air aspiration process (Step S5), a sample aspiration process (Step S6), a sample transport process (Step S7), a backlash process (Step S8), an injection valve switching process (Step S9), a sample-to-sample loop introduction process (Step S10), a sample-to-separation column introduction process (Step S11), a release-sample-from-sample loop process (Step S12), and a move-syringe-to-home position process (Step S13).

The sipper inner washing process (Step S1) is performed after the sample cup containing the sample purified/condensed with the magnetic beads at the pretreatment unit is transferred. At this time, the sipper 109 is at the home position. The home position of the sipper 109 is above the sample aspiration port. The sipper 109 rotates in a θ direction (vertical axis circumferential direction), and rotates to above the washing solvent discharge port 107a of the washing chamber 107 (107A). After that, the sipper 109 descends to the inside of the washing solvent discharge port 107a (inner washing position) in a Z-direction (vertical axial direction). The solvent used for washing the inner side of the sipper 109 is selected for any one of a system water or a plurality of washing solvents connected to the upstream of the washing pump 106 depending on the measurement target substance. In the case in which the inner side of the sipper 109 is washed with the system water, the two-way solenoid valve (not shown) between the syringe 103 and the system water container 105 is switched to the OPEN side, the system water in the system water container 105 is delivered in the inside of the passage to wash the inner side of the sipper 109. On the other hand, in the case in which the inner side of the sipper 109 is washed with the washing solvent is connected through the three-way solenoid valve on the down stream of the washing pump 106, any one of solvent SA (ultrapure water), solvent SB (acetonitrile), and solvent SC (methanol) is selected while the solenoid valve 111 is switched so as to be conducted to the normal close port and the common port, and the selected washing solvent is delivered in the inside of the passage to wash the inner side of the sipper 109 washing. The time for the sipper inner washing process (Step S1) is nine seconds, for example.

The sipper outer washing process (Step S2) is performed upon completion of the sipper inner washing process (Step S1). The sipper 109 is returned to the home position in the Z-direction. After that, the sipper 109 rotates in the θ direction, and rotates and moves to above the washing port 107b of the washing chamber 107 (in the case of the washing chamber 107A, the washing ports 107c and 107d), and in the case of the washing chamber 107, the sipper 109 rotates and moves to above the washing port 107b at one place, and in the case of the washing chamber 107A, the sipper 109 rotates and moves to above one washing port of the washing ports 107c and 107d at two places corresponding to the measurement target. After that, the sipper 109 descends in the inside of the washing port 107b (107c and 107d) (outer wash position) in the Z-direction, and the outer side of the sipper 109 is washed by vertically moving at a plurality of times. While washing the outer side of the sipper 109, the washing solvent in the washing port 107b (107c and 107d) of the washing chamber 107 (107A) is replaced. For the solvent used for washing the outer side of the sipper 109, any one of three kinds of washing solvents located on the up stream of the washing pump 106 is selected depending on the measurement target substance. The washing solvent connected through the three-way solenoid valve on the down stream of the washing pump 106 is solvent SA (ultrapure water), solvent SB (acetonitrile), and solvent SC (methanol). Any one of these solvents is selected, and the solenoid valve 110 is switched so as to conduct the normal close port to the common port, and the selected washing solvent is delivered in the inside of the passage and supplied to the washing port 107b (107c and 107d) of the washing chamber 107 (107A). The time for the sipper outer washing process (Step S2) is three seconds, for example.

The passage purge process (Step S3) is performed upon completion of the sipper outer washing process (Step S2). The sipper 109 is returned to the home position in the Z-direction. After that, the sipper 109 rotates in the θ direction, and rotates to above the washing solvent discharge port 107a. After that, the sipper 109 descends to the discharge position of the washing solvent in the Z-direction. The solvent used for washing the inner side of the sipper 109 is selected depending on the measurement target substance whether to be the system water or the washing solvent connected to the up stream of the washing pump 106. In the case of washing the sipper 109 with the system water, the two-way solenoid valve, not shown, between the syringe 103 and the system water container 105 is switched to the OPEN side, and the system water is delivered in the inside of the passage to wash the inner side of the sipper 109. On the other hand, in the case of washing the sipper 109 with the washing solvent connected to the three-way solenoid valve, not shown, on the up stream of the washing pump 106, any one of solvent SA (ultrapure water), solvent SB (acetonitrile), and solvent SC (methanol) is selected, while the solenoid valve 111 is switched so as to conduct the normal close port to the common port, and the selected washing solvent is delivered in the inside of the passage to wash the inner side of the sipper 109. The time for the passage purge process (Step S3) is four seconds, for example.

The move-sipper-to-home position process (Step S4) is performed upon completion of the passage purge process (Step S3). The sipper 109 is returned to the home position in the Z-direction. The sipper 109 rotates in the 0 direction, and rotates to above the home position. The time for the move-sipper-to-home position process (Step S4) is one second, for example.

The air aspiration process (Step S5) is performed upon completion of the move-sipper-to-home position process (Step S4). The solenoid valve 111 is switched so as to conduct the normal open port to the common port, and the syringe 103 is driven to aspirate air. In the present embodiment, the syringe 103 is driven for 20 pulses to aspirate 4 μL of air. During the air aspiration process (Step S5), the sipper 109 descends to the sample aspiration position in the Z-direction. The time for the air aspiration process (Step S5) is one second, for example. As described above, by aspirating air, air is sandwiched between the solution in the inside of the passage and the sample, and thus it is possible to reduce the diffusion of the sample into the solution. Therefore, analysis precision, specifically, reproducibility is improved.

The sample aspiration process (Step S6) is performed upon completion of the air aspiration process (Step S5). The syringe 103 is driven to aspirate the sample. In the present embodiment, the syringe 103 is driven by 175 pulses to aspirate to 35 μL of the sample. The time for the sample aspiration process (Step S6) is five seconds, for example.

FIGS. 13 to 17 are diagrams showing an example relationship between time and the syringe drive velocity. Moreover, FIGS. 18 to 22 are diagrams showing an example relationship between the pressure and the syringe drive velocity.

The sample that is an analysis target of the automatic analyzer is a biological sample, for example, including blood serum, crystals, urine, biological tissue, and the like. Moreover, in the automatic analyzer, there are a calibration sample, a quality management (QC: Quality Control) sample, and the like, other than the biological sample. In the present embodiment, the calibration sample and the QC sample are dissolved in a 30% methanol solution, for example. The sample is purified/condensed by the pretreatment unit using the magnetic bead, and the sample vessel 108 containing the sample is transferred to the sample cup holding unit of the functional units as the autosampler in the automatic analyzer. Since the viscosity of the sample to be transferred varies corresponding to the sample, the introduction position of the sample to the sample loop 102 varies in the parameter of the same syringe drive. Furthermore, in the case of a sample having a relatively high viscosity, the pressure in the inside of the passage rises, cavitation occurs, and air is produced in the inside of the passage. In other words, analysis precision fluctuates. The fluctuations in the analysis precision referred here mainly means degradation of reproducibility. Therefore, in the present embodiment, corresponding to the viscosity, the syringe drive velocity is changed.

Figure 13:
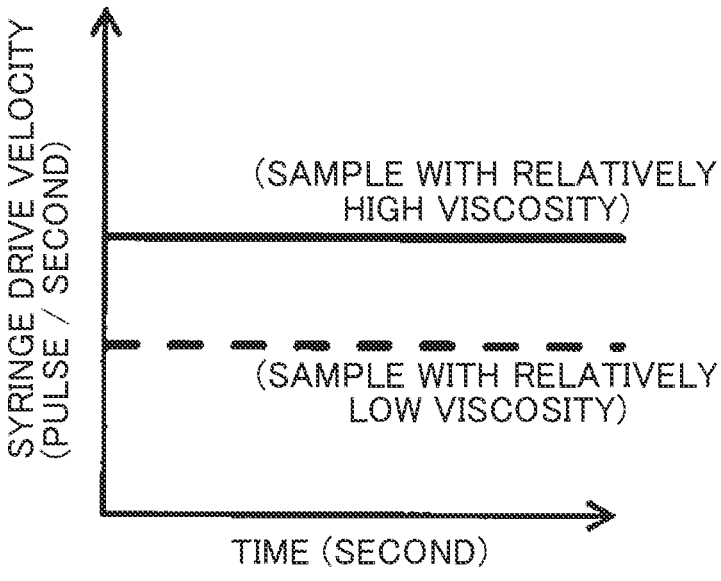
FIG. 13 is a diagram showing an example relationship between time and the syringe drive velocity, which is a diagram showing the case in which the syringe drive velocity is constant corresponding to a lapse of time.
Figure 14:
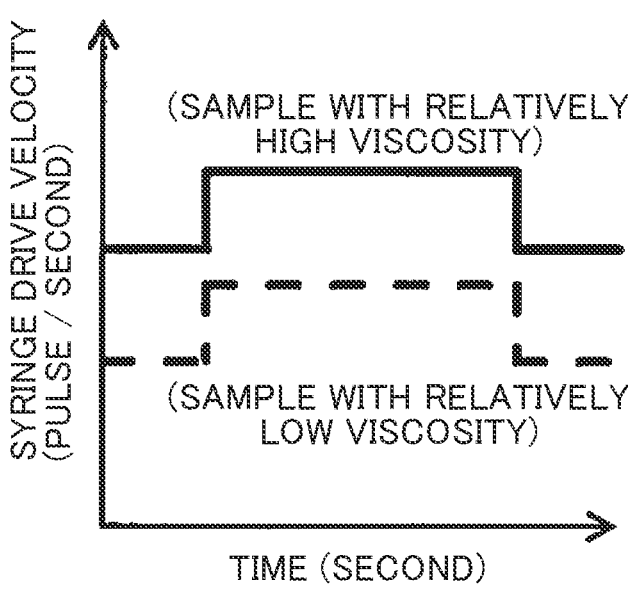
FIG. 14 is a diagram showing an example relationship between time and the syringe drive velocity, which is a diagram showing the case in which the syringe drive velocity is changed in a rectangular functional manner (nonlinearly) corresponding to a lapse of time.
Figure 15:
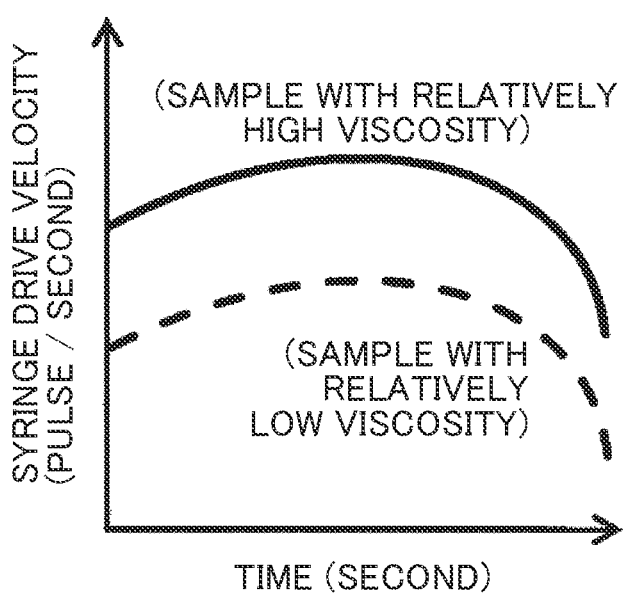
FIG. 15 is a diagram showing an example relationship between time and the syringe drive velocity, which is a diagram showing the case in which the syringe drive velocity is changed nonlinearly corresponding to a lapse of time.
Figure 16:
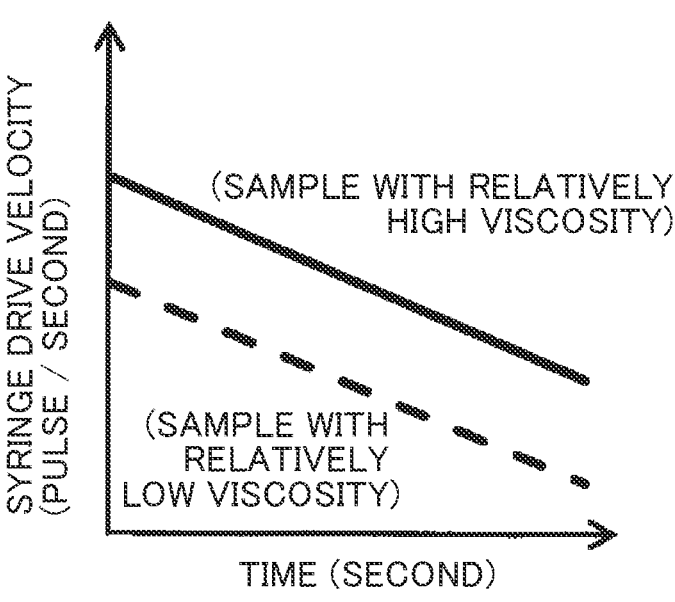
FIG. 16 is a diagram showing an example relationship between time and the syringe drive velocity, which is a diagram showing the case in which the syringe drive velocity is decreased linearly corresponding to a lapse of time.
Figure 17:
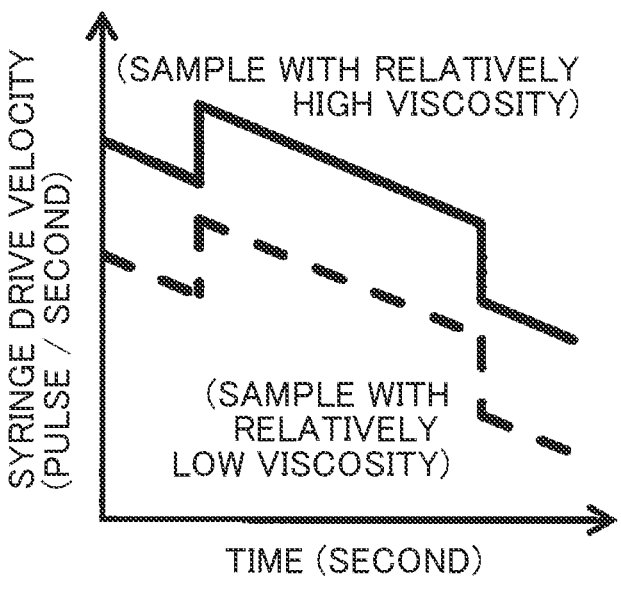
FIG. 17 is a diagram showing an example relationship between time and the syringe drive velocity, which is a diagram showing the case in which the syringe drive velocity is decreased in a rectangular functional manner (nonlinearly) corresponding to a lapse of time.

FIG. 13 is a diagram showing an example relationship between time and the syringe drive velocity, showing the case in which, the syringe drive velocity is constant over a lapse of time. Moreover, FIG. 14 is a diagram showing an example relationship between time and the syringe drive velocity, showing the case in which the syringe drive velocity changes in a rectangular function manner (nonlinear manner) over a lapse of time. In addition, FIG. 15 is a diagram showing an example relationship between time and the syringe drive velocity, showing the case in which the syringe drive velocity fluctuates nonlinearly over a lapse of time. Moreover, FIG. 16 is a diagram showing an example relationship between time and the syringe drive velocity, showing the case in which the syringe drive velocity reduces linearly over a lapse of time. Furthermore, FIG. 17 is a diagram showing an example relationship between time and the syringe drive velocity, showing the case in which the syringe drive velocity reduces in a rectangular function manner (nonlinear manner) over a lapse of time. Note that in FIGS. 13 to 17, in the case of a sample with a relatively high viscosity, the relationship between time and the syringe drive velocity is expressed by a solid line, and in the case of a sample with a relatively low viscosity, the relationship between time and the syringe drive velocity is expressed by a broken line. That is, in the case in which the viscosity of the sample is high, the syringe drive velocity is set lower than the case of a low viscosity. As described above, the parameter (viscosity) of the sample injected into the pre-treatment unit and the parameter (viscosity) of the pretreatment unit are acquired in advance, the syringe drive velocity is adjusted corresponding to this viscosity, and thus it is possible to stabilize the introduction position of the sample to the sample loop 102 all the time, and it is possible to improve analysis precision.

Moreover, it is possible to obtain similar effects as well by adjusting the syringe drive velocity corresponding to the pressure value in the inside of the passage. Therefore, a case is shown in which the pressure in the inside of the passage is fed back to the adjustment of the syringe drive velocity while monitoring the pressure.

Figure 18:
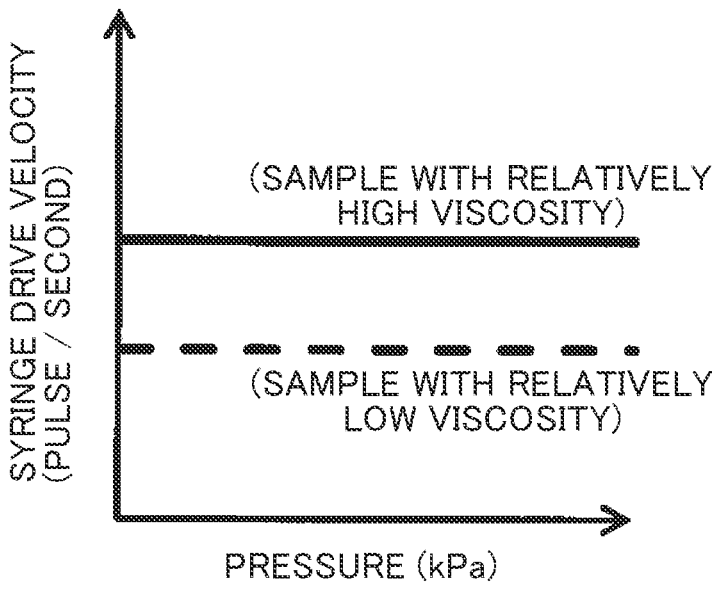
FIG. 18 is a diagram showing an example relationship between the pressure and the syringe drive velocity, which is a diagram showing the case in which the syringe drive velocity is constant corresponding to a change in the pressure.
Figure 19:
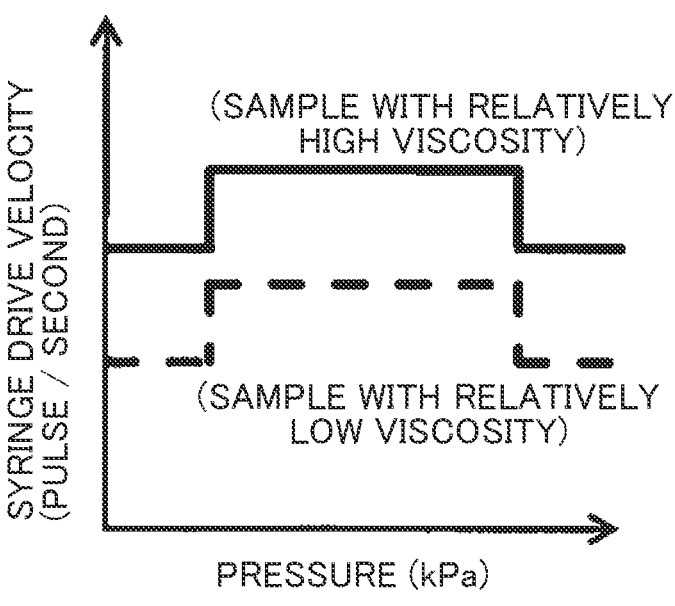
FIG. 19 is a diagram showing an example relationship between the pressure and the syringe drive velocity, which is a diagram showing the case in which the syringe drive velocity is changed in a rectangular functional manner (nonlinearly) corresponding to a change in the pressure.
Figure 20:
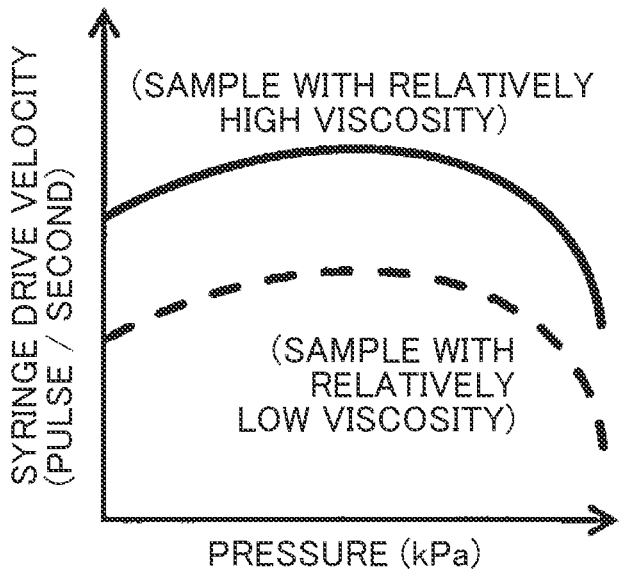
FIG. 20 is a diagram showing an example relationship between the pressure and the syringe drive velocity, which is a diagram showing the case in which the syringe drive velocity is changed nonlinearly corresponding to a change in the pressure.
Figure 21:
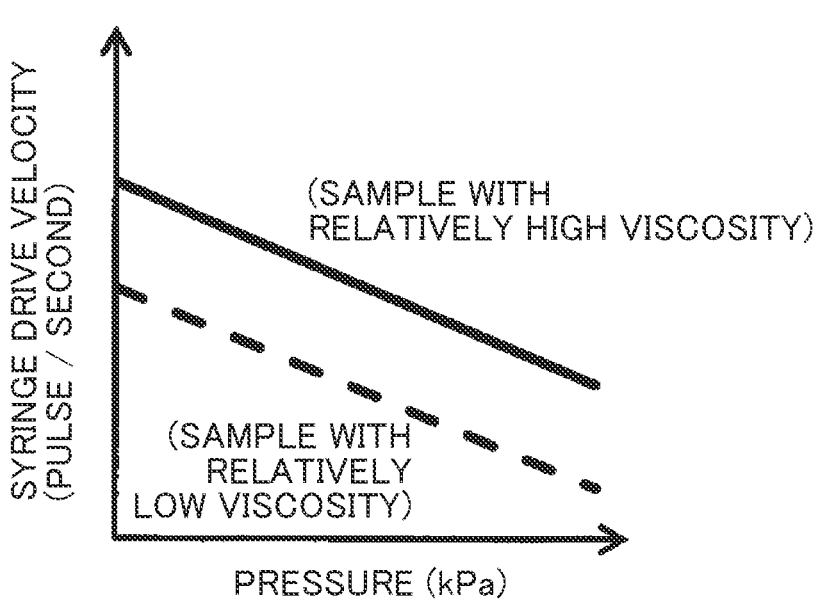
FIG. 21 is a diagram showing an example relationship between the pressure and the syringe drive velocity, which is a diagram showing the case in which the syringe drive velocity is decreased linearly corresponding to a change (increase) in the pressure.
Figure 22:
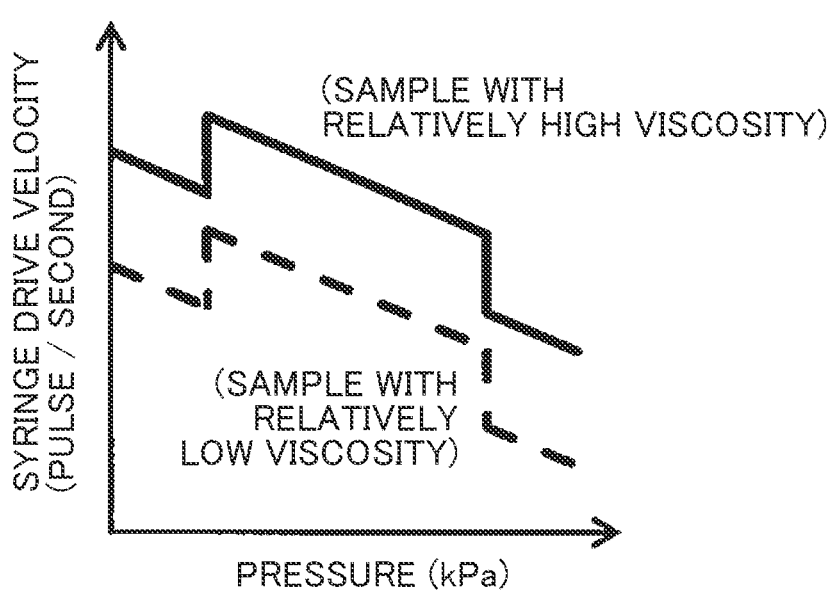
FIG. 22 is a diagram showing an example relationship between the pressure and the syringe drive velocity, which is a diagram showing the case in which the syringe drive velocity is decreased in a rectangular functional manner (nonlinearly) corresponding to a change (increase) in the pressure.

FIG. 18 is a diagram showing an example relationship between the pressure and the syringe drive velocity, showing the case in which the syringe drive velocity is constant corresponding to a change in the pressure. Moreover, FIG. 19 is a diagram showing an example relationship between the pressure and the syringe drive velocity, showing the case in which the syringe drive velocity changes in a rectangular function manner (nonlinear manner) corresponding to a change in the pressure. Furthermore, FIG. 20 is a diagram showing an example relationship between the pressure and the syringe drive velocity, showing the case in which the syringe drive velocity fluctuates nonlinearly corresponding to a change in the pressure. Moreover, FIG. 21 is a diagram showing an example relationship between the pressure and the syringe drive velocity, showing the case in which the syringe drive velocity reduces linearly corresponding to a change (increase) in the pressure. Furthermore, FIG. 22 is a diagram showing an example relationship between the pressure and the syringe drive velocity, showing the case in which the syringe drive velocity reduces in a rectangular function manner (nonlinear manner) corresponding to a change (increase) in the pressure. Note that in FIGS. 18 to 22, in the case of a sample with a relatively high viscosity, the relationship between the pressure and the syringe drive velocity is expressed by a solid line, and in the case of a sample with a relatively low viscosity, the relationship between the pressure and the syringe drive velocity is expressed by a broken line. That is, in the case in which the viscosity of the sample is high, the syringe drive velocity is set lower than in the case of a low viscosity. As described above, the pressure in the inside of the passage is monitored, the syringe drive velocity is adjusted corresponding to this pressure, and thus it is possible to stabilize the introduction position of the sample to the sample loop 102 all the time, and it is possible to improve analysis precision. Note that although various methods can be considered for the method of detecting the pressure in the inside of the passage, in the present embodiment, a case is exemplified in which the syringe 103 detects the pressure in the inside of the passage based on a drive load. Moreover, a configuration may be provided in which a function that detects the pressure in the inside of the passage is separately provided.

The sample transport process (Step S7) is performed upon completion of the sample aspiration process (Step S6). The sipper 109 is returned to the home position in the Z-direction. Subsequently, the syringe 103 is driven to aspirate air. In the present embodiment, the syringe 103 is driven by 150 pulses to aspirate 30 μL of air. The time for the sample transport process (Step S7) is four seconds, for example. In the sample transport process (Step S7), the syringe drive velocity is set faster than in the other processes in order to achieve "shortening sample introduction time". In the case in which the syringe drive velocity is fast, the influence of the pressure loss in the inside of the passage is strongly affected, adjustment is possible to appropriately set the syringe drive amount. To this end, a field to which an adjustment parameter can be input is provided on a software screen as a parameter of adjusting the syringe drive amount. Preferably, an automatic adjustment function may be provided corresponding to analysis precision in the case in which a calibration sample is analyzed. In this case, specifically, the syringe drive parameter is changed pulse by pulse, and the parameter of the syringe drive amount at which the peak strength is the highest is adopted.

The backlash process (Step S8) is performed upon completion of the sample transport process (Step S7). The backlash process (Step S8) is a process of reducing pressure by returning the syringe drive amount to the discharge side in the Z-direction in order to reduce the pressure applied to the inside of the passage by syringe drive up to the sample transport process (Step S7). In the present embodiment, the syringe is driven by five pulses to discharge 1 μL air. The time for the backlash process (Step S8) is one second, for example.

The injection valve switching process (Step S9) is performed upon completion of the backlash process (Step S8).

Figure 2:
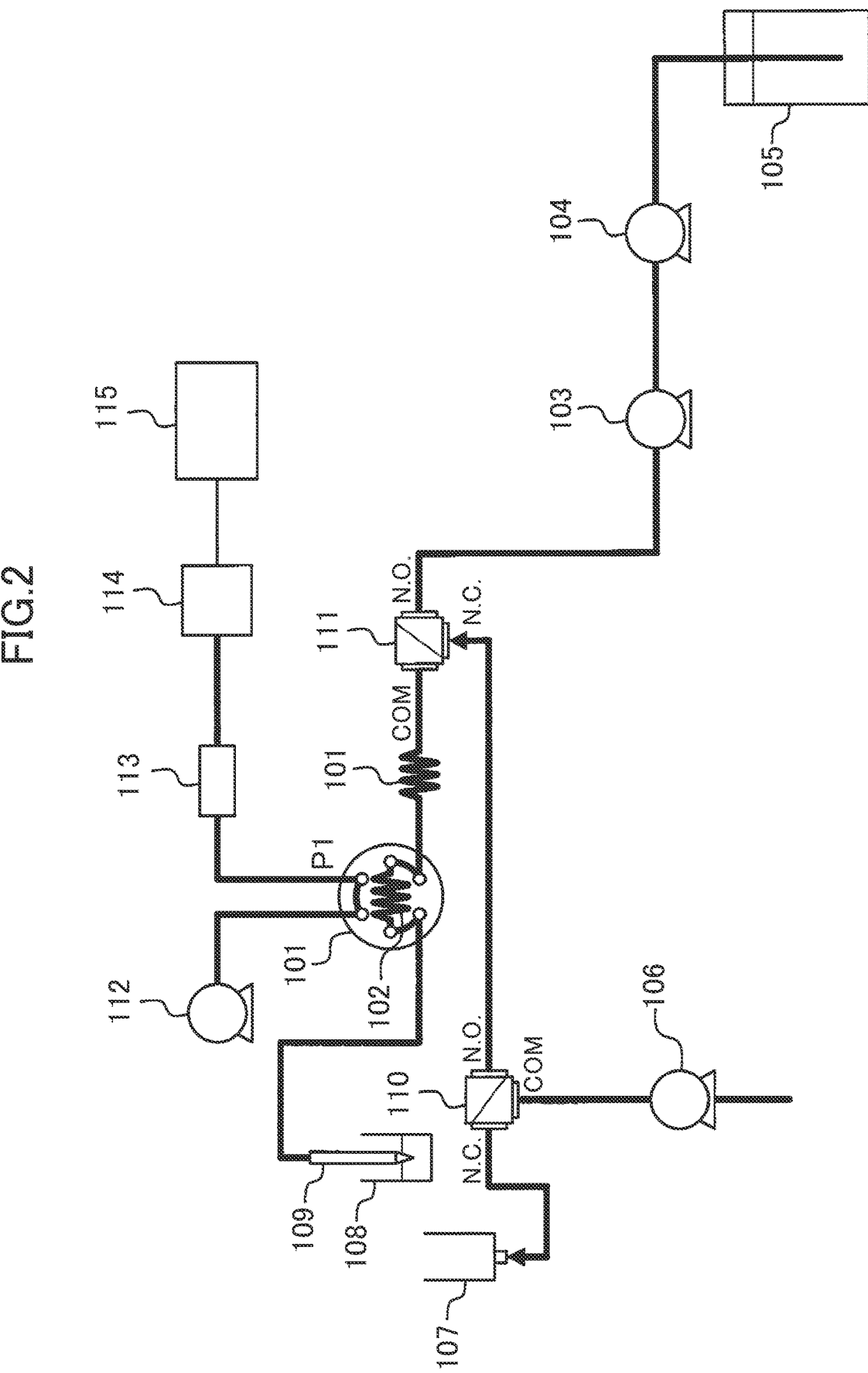
FIG. 2 is a diagram schematically showing an electric drive system including the regenerative braking system of an electric drive dump truck according to a first embodiment.

FIG. 2 is a diagram schematically showing the functional units as the autosampler in the overall structure of the automatic analyzer extracted together with the relating components, and is a diagram showing the manner of the injection valve switching process. That is, FIG. 2 shows a state in which the injection valve 101 is switched from the position A to the position B and the sipper 109, the sample loop 102, and the solenoid valve 111 are connected to each other. The time for the injection valve switching process (Step S9) is 0.2 seconds, for example.

The sample-to-sample loop introduction process (Step S10) is performed upon completion of the injection valve switching process (Step S9).

Figure 3:
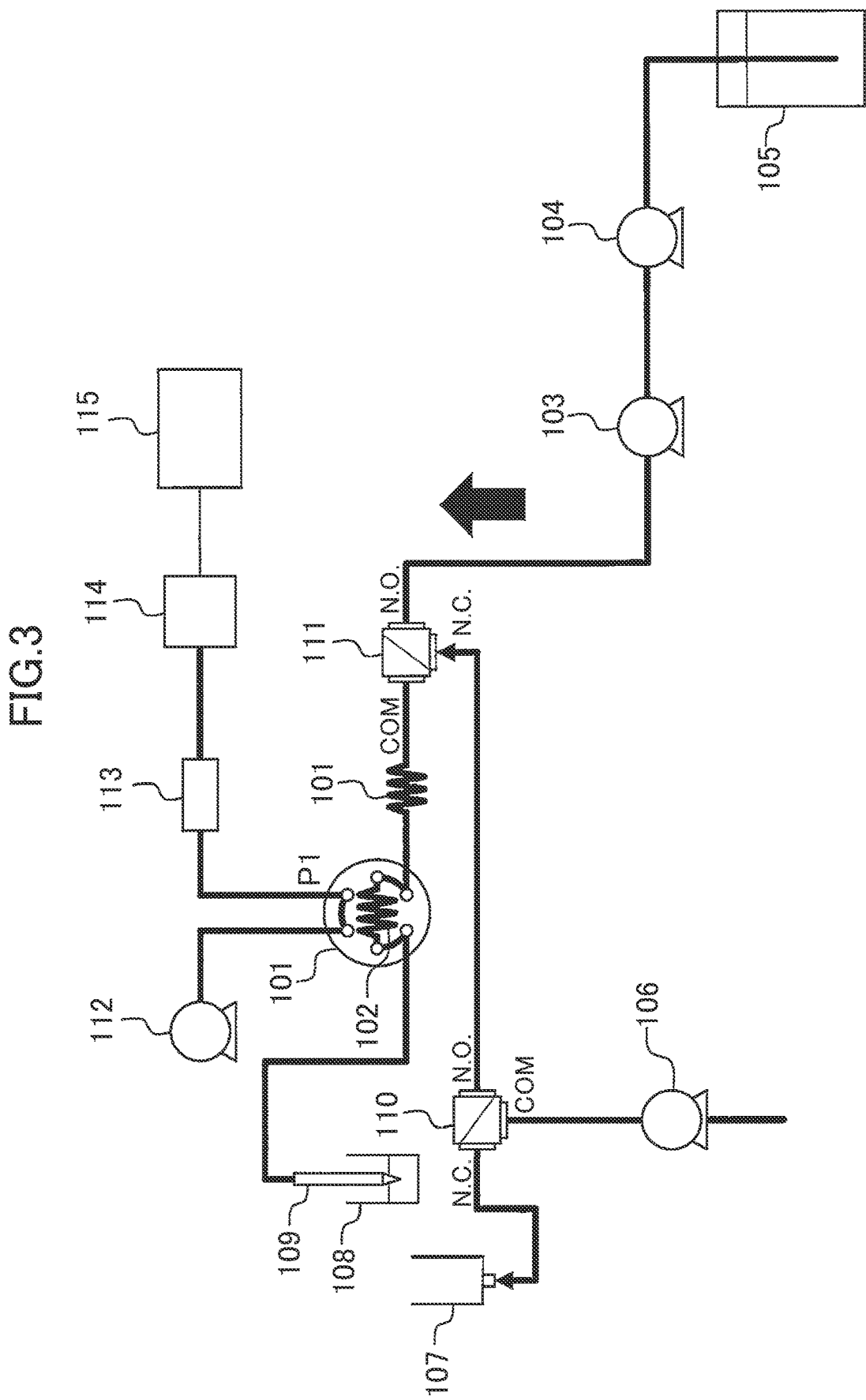
FIG. 3 is a diagram schematically showing an example configuration of a power conversion module.
Figure 4:
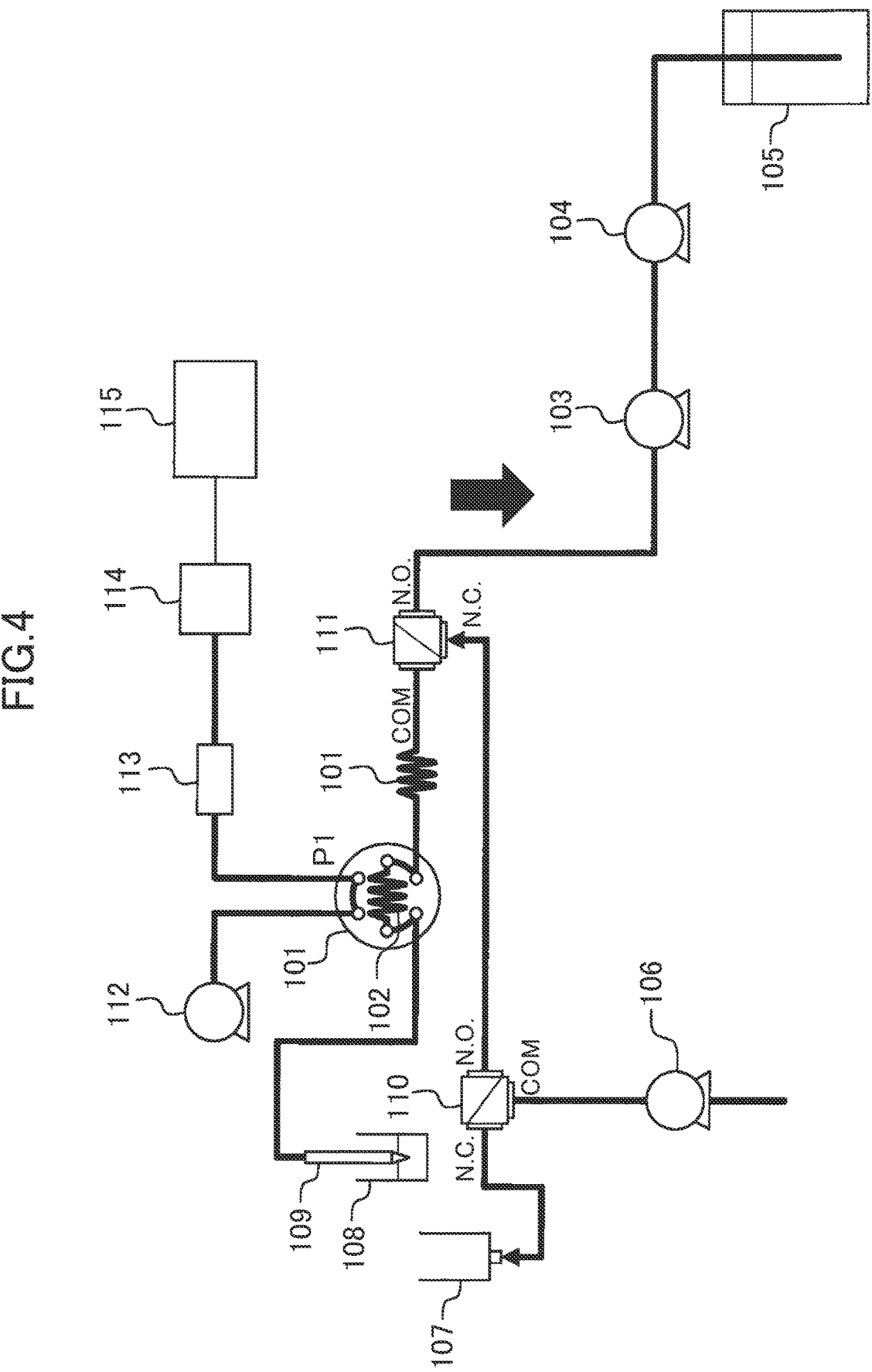
FIG. 4 is a diagram showing an example operation of a bypass device.

FIGS. 3 and 4 are diagrams schematically showing the functional units as the autosampler in the overall structure of the automatic analyzer extracted together with the relating components. FIG. 3 is a diagram showing the manner of the sample-to-sample loop introduction process (push mode), and FIG. 4 is a diagram showing the manner of the sample-to-sample loop introduction process (lead-in mode).

As shown in FIG. 3, in the sample-to-sample loop introduction process (Step S9) according to the push mode, the syringe 103 is driven to discharge the sample into the sample loop 102. In the present embodiment, the syringe 103 is driven by 50 pulses to discharge 10 μL of the sample into the sample loop 102. That is, the syringe 103 is driven in the direction of pushing the sample into the sample loop 102 to perform sample introduction. The time for the sample-to-sample loop introduction process (Step S10) is six seconds, for example.

As shown in FIG. 4, in the sample-to-sample loop introduction process (Step S9) according to the lead-in mode, the syringe 103 is driven to lead the sample into the sample loop 102. In the present embodiment, the syringe 103 is driven by 50 pulses to lead 10 μL of the sample into the sample loop 102. That is, the syringe 103 is driven in the direction leading the sample into the sample loop 102, and sample introduction is performed. The time for the sample-to-sample loop introduction process (Step S10) is six seconds, for example.

Note that in the sample-to-sample loop introduction process (Step S10), the sample can be quantified by two modes that can adjust the sample introduction amount into the sample loop 102, i.e., the "Partial Loop Injection mode" that quantifies the sample corresponding to the syringe drive amount (the sample loop capacity>the sample introduction amount into the sample loop corresponding to the syringe drive amount), and the "Full Loop Injection" that quantifies the sample based on the sample loop capacity (the sample loop capacity the sample introduction amount into the sample loop corresponding to the syringe drive amount).

Moreover, also in the sample-to-sample loop introduction process (Step S10), the syringe drive velocity is appropriately set corresponding to the viscosity of the sample and the monitored pressure value, and it is possible to improve analysis precision.

Furthermore, since the pressure around the sample loop 102 is switched from a high pressure to a low pressure in the injection valve switching process (Step S9), the pressure is released, and the sample moved to the previous and subsequent stages of the sample loop 102 moves. Therefore, corresponding to the "Partial Loop Injection mode", the "Full Loop Injection", and the set value of the injection capacity, the parameter of the syringe drive amount in the sample-to-sample loop introduction process (Step S10) changes. From this amount of change, the parameter of the syringe drive amount can be adjusted depending on whether the user attaches importance to the reproducibility of analysis precision, or the user attaches importance to displacement from a true value. To this end, the software screen is provided with a field to which the analysis importance mode can be input such that the user can set the analysis importance mode. Preferably, an automatic adjustment function may be provided corresponding to the analysis importance mode in the case in which the calibration sample is analyzed. In this case, specifically, in the case in which the syringe drive parameter is changed pulse by pulse and importance is attached to the reproducibility of analysis precision, fluctuations in peak strength are adopted, whereas in the case in which importance is attached to displacement from the true value, the parameter of the syringe drive amount at which the peak strength is the highest is adopted. In regard to the items of the analysis importance mode, throughput, the sample consumption amount, or the like can be additionally.

The sample-to-separation column introduction process (Step S11) is performed upon completion of the sample-to-sample loop introduction process (Step S10).

Figure 5:
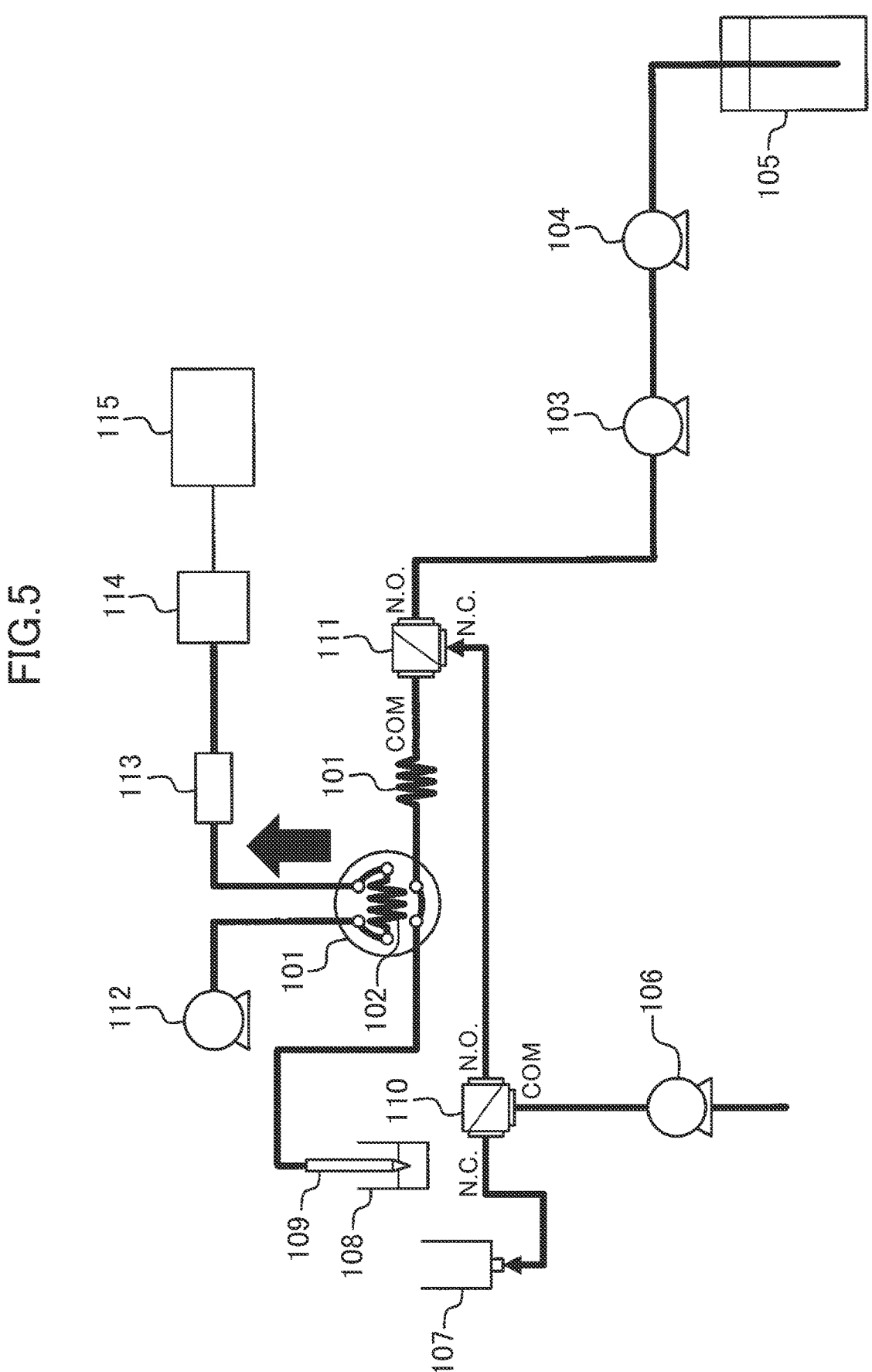
FIG. 5 is a functional block diagram schematically showing processing functions of a controller according to the first embodiment.

FIG. 5 is a diagram schematically showing the functional units as the autosampler in the overall structure of the automatic analyzer extracted together with the relating components, and is a diagram showing the manner of the sample-to-separation column introduction process.

As shown in FIG. 5, in the sample-to-separation column introduction process (Step S11), the position B of the injection valve 101 is switched to the position A, and the liquid delivery pump 112, the sample loop 102, and the separation column 113 are connected to each other. The time for the sample-to-separation column introduction process (Step S11) is 0.2 seconds, for example.

The release-sample-from-sample loop process (Step S12) is performed upon completion of the sample-to-separation column introduction process (Step S11). The sipper 109 ascends to the home position in the Z-direction. After that, the sipper 109 rotates to above the discharge position of the washing solvent. The syringe 103 is driven in the discharge direction by the home position+few pulses. In the present embodiment, during the sipper inner washing process (Step S1) to the sample-to-separation column introduction process (Step S11), the syringe is driven by 50 pulses (by 10 μL) in addition to the syringe movement amount, waste water is discharged at the discharge position of the washing solvent of the washing chamber 107. The time for the release-sample-from-sample loop process (Step S12) is four seconds, for example.

The move-syringe-to-home position process (Step S13) is performed upon completion of the sample-to-separation column introduction process (Step S11). The position of the syringe moves to the home position. The move-syringe-to-home position process (Step S13) is started simultaneously with the release-sample-from-sample loop process (Step S12). The time for the move-syringe-to-home position process (Step S13) is one second, for example.

In the present embodiment configured as described above, it is possible to improve robustness, throughput, and measurement precision. That is, it is possible to achieve "structural simplicity" and "being maintenance free" in regard to robustness, "shortening the washing process" and "shortening the sample introduction process" in regard to throughput, and "the optimization of the washing process" and "the optimization of the sample introduction process" in regard to measurement precision.

In regard to "structural simplicity" in robustness, since the "Partial Loop injection mode" is adopted in the present embodiment, it is unnecessary to keep a high pressure (e.g. 100 MPa) as in the "Direct Injection mode", it is possible to provide a structure including no fitting for high pressure, and it is possible to simplify the structure. Moreover, a structure is provided in which the pump is connected to the valve and the valve is connected to the sipper in the shortest passage length and the shortest passage inner diameter, and thus it is possible to further simplify the structure.

Furthermore, in regard to "being maintenance free" in robustness, it is possible to operate maintenance in a state of a significantly low maintenance frequency because "structural simplicity" is achieved. That is, for example, a regular maintenance frequency conducted by a service person is performed once a year.

Moreover, in regard to "shortening the washing process" in throughput, it is possible to operate the time drive of the washing pump and the gear pump used in the washing process for the shortest time because "structural simplicity" is achieved. That is, in order to suppress carry-over, no washing is performed in the aspiration/discharge of the syringe, the gear pump that supplies the washing pump and the system water is provided, and shortened washing time is implemented by optimizing the drive timing of these pumps.

Furthermore, in regard to "shortening the sample introduction process" in throughput, the pipe length is minimized between the syringe that aspirates/discharges the sample and the sipper at the sample aspiration port in the sample cup, the pipe inner diameter is minimized, and the volume in the pipe is minimized, and thus shortening the time for sample introduction is to be implemented. For example, in the present embodiment, it is possible to introduce the sample for every 36 seconds.

Moreover, in regard to "the optimization of the washing process" in measurement precision, unlike performing washing after the sample is introduced, the process of which is installed in a typical HPLC autosampler, the washing process is allocated in the first half of a series of the sample introduction process, and it is possible to perform washing immediately before introducing the sample. Thus, it is possible to reduce the mixing of air in the inside of the passage under the conditions at a low pressure and the mixing of bubbles due to fluctuations in pressure that occur by switching the conditions of high pressure from the liquid delivery pump and low pressure from the syringe when the injection valve is switched. In other words, even though bubbles are mixed, bubbles are removed before starting the operation of introduction of the sample.

Moreover, in regard to "the optimization of the sample introduction process" in measurement precision, the pipe length is minimized between the syringe that aspirates/discharges the sample and the sipper at the sample aspiration port in the sample cup, and the volume in the pipe is minimized, and thus it is possible to implement shortening throughput (e.g. sample introduction including the washing process for every 36 seconds). Furthermore, the drive parameter of the syringe is changed corresponding to the physical properties of the sample, e.g. the viscosity or the composition of the solvent, it is possible to perform measurement of high precision. Moreover, "the optimization of the washing process" and "the optimization of the sample introduction process" are performed, it is possible to achieve precision (for example, 5% CV) and accuracy (for example, 10%) requested for automatic analyzers for clinical examinations in regard to measurement precision. Furthermore, it is made possible to achieve 0.001% also in regard to carry-over.

<Additional Remark>

Note that the present invention is not limited to the foregoing embodiment, and includes various exemplary modifications and combinations within the scope not deviating from the gist. Moreover, the present invention is not limited to ones including all the configurations described in the foregoing embodiment, including ones from which a part of the configuration is removed. Furthermore, a part or all of the configurations, functions, and the like may be implemented by design of an integrated circuit, for example. Moreover, the configurations, functions, and the like may be implemented by software in which a processor interprets and executes programs that implement the functions.

REFERENCE SIGNS LIST

101: injection valve,
101a to 101f: sample port,
102: sample loop,
103: syringe,
104: gear pump,
105: system water container,
106: washing pump,
107, 107A: washing chamber,
107a: washing solvent discharge port,
107b: washing port,
107c: washing port,
107d: washing port,
108: sample vessel,
109: sipper,
110,111: solenoid valve,
112: liquid delivery pump,
113: separation column,
114: detector,
115: controller

The invention claimed is:

1. A control method for an automatic analyzer including a switch valve having a plurality of sample ports, the switch valve configured to selectively switch between conduction and interruption between the plurality of sample ports, a sample loop connected between two sample ports, a first sample port and a second sample port in the plurality of sample ports of the switch valve, a syringe connected to a third sample port of the plurality of sample ports that is different from the first sample port and the second sample port of the switch valve, a sipper connected to a fourth sample port of the plurality of sample ports that is different from the first sample port, the second sample, and the third sample port of the switch valve, the sipper immersed in a sample housed in a sample vessel, the method comprising:

adjusting a drive parameter of the syringe, which is a drive velocity of the syringe, based on a viscosity of the sample in advance;

switching the switch valve to a first state in which the sipper and the syringe are in fluid communication with each other without passing through the sample loop;

driving the syringe based on the drive parameter to draw and introduce the sample through the sipper;

switching the switch valve to a second state in which the syringe and the sample loop are in fluid communication with each other; and driving the syringe based on the drive parameter to introduce the sample into the sample loop, wherein the drive velocity of the syringe is linearly changed according to a lapse of a driving time of the syringe.

2. The control method for an automatic analyzer according to claim 1, wherein in the step of driving the syringe based on the drive parameter to introduce the sample into the sample loop, the sample is downstream of the switch valve and is introduced into the sample loop from an upstream side of the switch valve using the syringe.

3. The control method for an automatic analyzer according to claim 1, wherein in the step of driving the syringe based on the drive parameter to introduce the sample into the sample loop, the sample is pushed back to the sample loop from a downstream side of the switch valve with respect to the sipper using the syringe.

4. The control method for an automatic analyzer according to claim 1, wherein the drive parameter for the syringe is adjusted based on a change in a pressure of the syringe.

5. The control method for an automatic analyzer according to claim 1, wherein in the step of driving the syringe based on the drive parameter to introduce the sample into the sample loop, the drive parameter for the syringe is adjusted based on whether an introduction amount of the sample to be introduced into the sample loop is smaller than a capacity of the sample loop.

6. The control method for an automatic analyzer according to claim 1, wherein the drive parameter for the syringe is adjusted based on a pressure loss in passage acquired in advance.

7. A control method for an automatic analyzer including a switch valve having a plurality of sample ports, the switch valve configured to selectively switch between conduction and interruption between the plurality of sample ports, a sample loop connected between two sample ports, a first sample port and a second sample port in the plurality of sample ports of the switch valve, a syringe connected to a third sample port of the plurality of sample ports that is different from the first sample port and the second sample port of the switch valve, a sipper connected to a fourth sample port of the plurality of sample ports that is different from the first sample port, the second sample, and the third sample port of the switch valve, the sipper immersed in a sample housed in a sample vessel, the method comprising:

adjusting a drive parameter of the syringe, which is a drive velocity of the syringe, based on a viscosity of the sample in advance;

switching the switch valve to a first state in which the sipper and the syringe are in fluid communication with each other without passing through the sample loop;

driving the syringe based on the drive parameter to draw and introduce the sample through the sipper;

switching the switch valve to a second state in which the syringe and the sample loop are in fluid communication with each other; and driving the syringe based on the drive parameter to introduce the sample into the sample loop, wherein the drive parameter for the syringe is adjusted such that the drive parameter is nonlinearly changed corresponding to a lapse of a driving time of the syringe.

* * * * *